United States Patent
Wang et al.

(10) Patent No.: US 7,317,453 B2
(45) Date of Patent: Jan. 8, 2008

(54) VIDEO GRAPHICS ARRAY COLOR SIGNAL GENERATOR

(75) Inventors: Jian-Feng Wang, Guangdong (CN); Jian-Jun Zhu, Guangdong (CN); Liang-Yan Dai, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,152

(22) Filed: Mar. 8, 2006

(65) Prior Publication Data

US 2006/0227127 A1  Oct. 12, 2006

(30) Foreign Application Priority Data

Apr. 7, 2005  (CN) .................. 2005 1 0034103

(51) Int. Cl.
  *G09G 5/00*  (2006.01)
  *H04N 17/02*  (2006.01)
(52) U.S. Cl. ..................... 345/204; 348/181
(58) Field of Classification Search ............... 345/204, 345/904, 208, 212, 10
See application file for complete search history.

(56) References Cited

U.S. PATENT DOCUMENTS

| | | | |
|---|---|---|---|
| 5,602,586 A * | 2/1997 | Schauer et al. | 348/189 |
| 6,747,620 B2 * | 6/2004 | Jun | 345/87 |
| 7,023,470 B2 * | 4/2006 | Braun | 348/180 |
| 7,180,477 B2 * | 2/2007 | Howell | 345/10 |
| 2003/0218622 A1 | 11/2003 | Chang et al. | |
| 2005/0209802 A1 * | 9/2005 | Taraci | 702/67 |

* cited by examiner

*Primary Examiner*—Duc Q Dinh
(74) *Attorney, Agent, or Firm*—Winston Hsu

(57) ABSTRACT

A video graphics array color signal generator is provided. The signal generator includes an FPGA (field program gate array) device (1), a PROM (programmable read only memory) (2), a PLL (phase locked loop) circuit (3), a D/A (digital/analog) convertor (4) connected with the FPGA device, a VGA (video graphics array) interface (5), a pixel clock generator (6) which generates pixel clocks continuously at a frequency, and a keyboard (7) which provides operating buttons for users.

9 Claims, 4 Drawing Sheets

VIDEO GRAPHICS ARRAY COLOR SIGNAL GENERATOR

DESCRIPTION

1. Field of the Invention

The present invention generally relates to video graphics array color signal generators which generate color signals to test liquid crystal display (LCD) monitors.

2. Description of Related Art

Signal generators are widely used by electrical and electronic engineers to test electronic equipment. Similarly, before shipping LCD monitors, the electronic engineers use color signal generators to test the display quality of each LCD monitor. Color signals generated by the color signal generators should accord with the Video Electronics Standards Association (VESA) standard. During testing, the color signals are sent to the video graphics array interface of each LCD monitor.

However, conventional color signal generators are expensive and bulky.

What is needed, therefore, is a video graphics array color signal generator, which is inexpensive, small and convenient in testing LCD monitors, and can automatically generate color signals as do conventional color signal generators.

SUMMARY OF INVENTION

A video graphics array color signal generator is provided. The signal generator includes an FPGA (field program gate array) device, a PROM (programmable read only memory), a PLL (phase locked loop) circuit, a D/A (digital/analog) convertor connected with the FPGA device, a VGA (video graphics array) interface, a pixel clock generator which generates pixel clocks continuously at a frequency, and a keyboard which provides operating buttons for users to operate the FPGA device, such as selecting a VGA mode or a display pattern. The FPGA device is used for generating horizontal sync frequencies and vertical sync frequencies according to a selected VGA mode, and for generating digital signals on RGB (red-green-blue) color according to a selected display pattern.

The PROM is used for storing configuration files. Each time the FPGA device is powered on, the configuration files can be downloaded from the PROM to start the FPGA device. The D/A convertor converts digital signals received from the FPGA device into analog signals, and transmits the analog signals to the VGA interface. The VGA interface is used for outputting video graphics array color signals to test LCD monitors.

The FPGA device includes a ROM, a RAM, a horizontal & vertical frequency signal generator, a display pattern generator, an M counter and an N counter.

The ROM provides parameters on all kinds of VGA modes. The M counter and the N counter obtain values of the parameters in the RAM, and generate a suitable reference frequency and a feedback frequency respectively. The PLL circuit outputs a pixel clock frequency to the horizontal & vertical frequency signal generator after the feedback frequency and reference frequency are generated. Subsequently, the horizontal & vertical frequency signal generator generates a horizontal sync frequency and a vertical sync frequency. The display pattern generator generates a plurality of color signals on RGB in digital format, which are directly sent to the D/A convertor.

Other advantages and novel features of the embodiments will be drawn from the following detailed description with reference to the attached drawings, in which:

DETAILED DESCRIPTION

In order to describe the preferred embodiments conveniently, the following technical terms are used:
Ht: horizontal total;
Hbs: horizontal black start;
Hss: horizontal sync start;
Hse: horizontal sync end;
Hb: horizontal black; and
Hs: horizontal sync.

Figure 1:
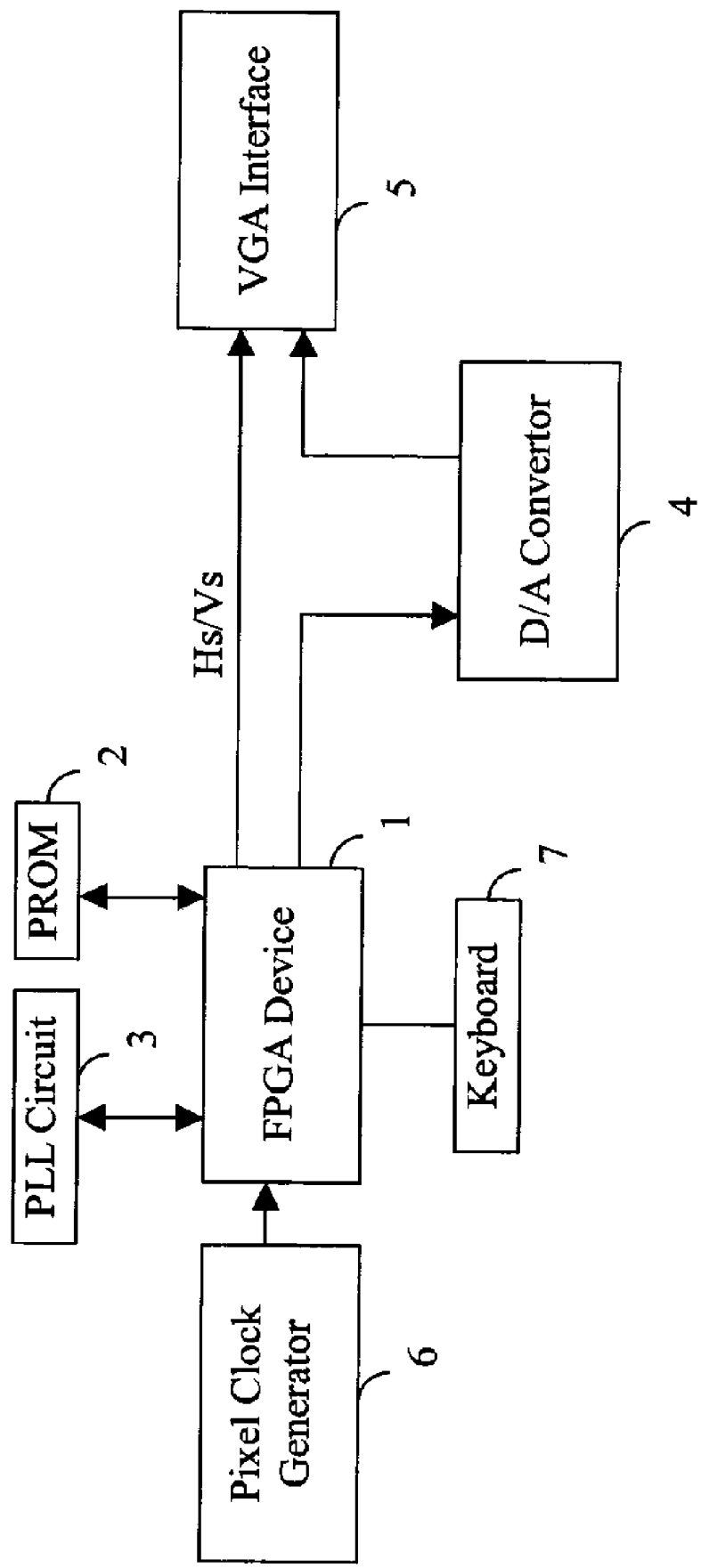
FIG. 1 is a schematic diagram of a video graphics array color signal generator in accordance with a preferred embodiment.

FIG. 1 is a schematic diagram of a video graphics array color signal generator (hereinafter, "the signal generator") in accordance with a preferred embodiment. The signal generator includes an FPGA (field program gate array) device 1, a PROM (programmable read only memory) 2, a PLL (phase locked loop) circuit 3, a D/A (digital/analog) convertor 4 connected with the FPGA device 1, a VGA (video graphite graphics array) interface 5, a pixel clock generator 6 which outputs pixel clocks continuously at a frequency to the FPGA device 1, and a keyboard 7 which provides operating buttons for users to operate the FPGA device 1, such as selecting a VGA mode or a display pattern. The FPGA device 1 generates horizontal sync frequencies and vertical sync frequencies according to a selected VGA mode, generates digital signals on RGB (red-green-blue) color according to a selected display pattern, and transmits the horizontal sync frequencies and the vertical sync frequencies to the VGA interface 5. Further, the FPGA device 1 also transmits the digital signals on RGB color to the D/A convertor 4. After receiving the digital signals on RGB color from a display pattern generator (introduced below in relation to FIG. 2) of the FPGA device 1, the D/A convertor 4 converts the digital signals into analog signals, and transmits the analog signals to the VGA interface 5. Subsequently, the VGA interface 5 outputs video graphics array color signals. The VGA interface 5 is a universal interface which can be directly connected to an LCD monitor (not shown) to test the LCD monitor. The PROM 2 is used for storing configuration files. When the FPGA device 1 is powered on, the configuration files can be downloaded from the PROM 2 to start the FPGA device 1. However, the configuration files in the FPGA device 1 are cleared when the FPGA device 1 is powered off. The PLL circuit 3 includes: a first input port (not shown), for receiving reference frequencies from an N counter of the FPGA device 1 (introduced below in relation to FIG. 2); a second input port (not shown), for receiving feedback frequencies from an M counter of the FPGA device 1 (introduced below in relation to FIG. 2); and an output port (not shown), for outputting a required pixel clock frequency to the FPGA device 1.

Figure 2:
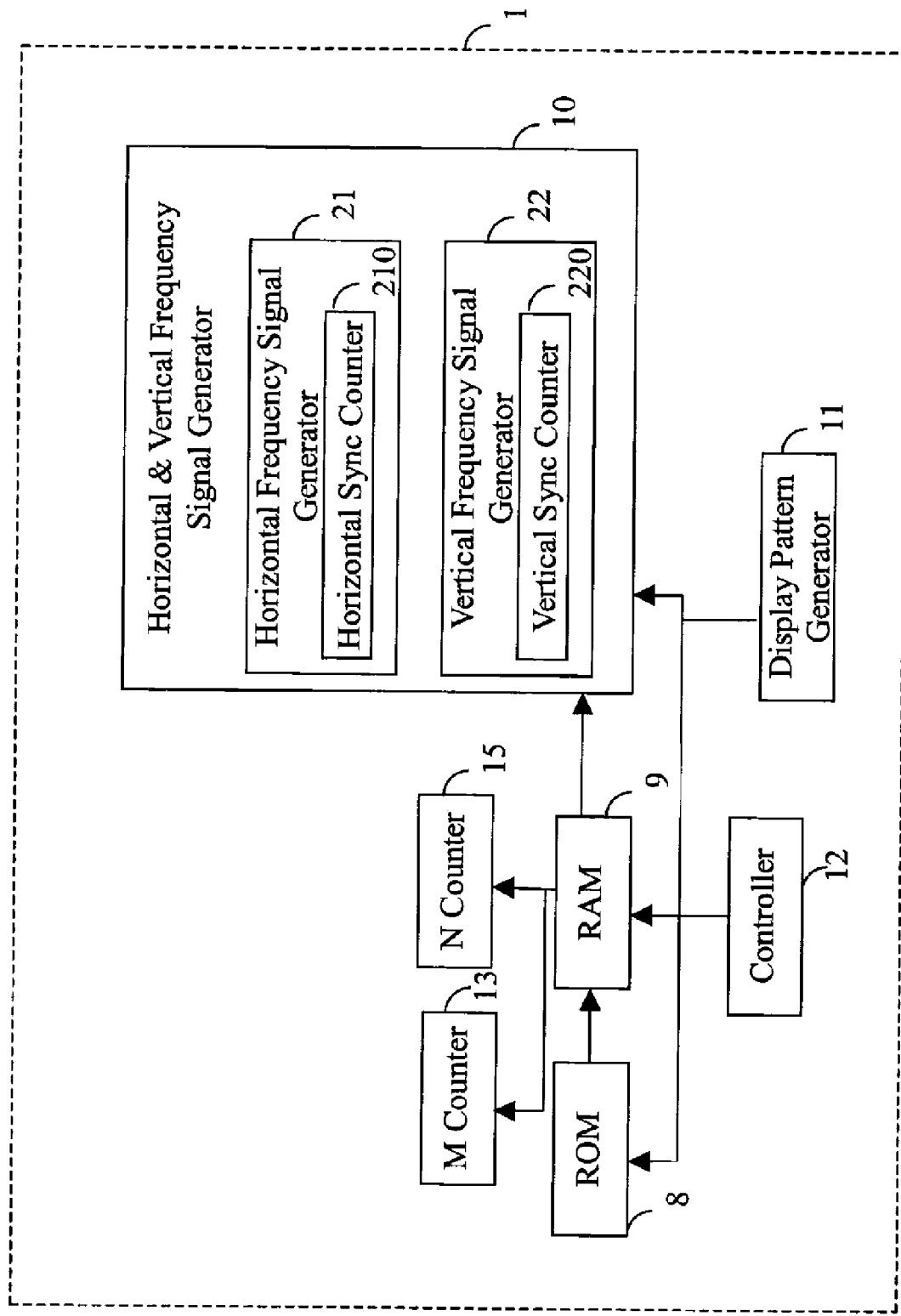
FIG. 2 is schematic diagram of configuration of an FPGA device of FIG. 1.

FIG. 2 is schematic diagram of configuration of the FPGA device 1. The FPGA device 1 includes a ROM (read only memory) 8, a RAM (random access memory) 9, a horizontal & vertical frequency signal generator 10, a display pattern generator 11, a controller 12, an M counter 13 and an N counter 15. The ROM 8 provides parameters on all kinds of VGA modes. When a user selects a new VGA mode via the keyboard 7, the controller 12 transmits a control signal corresponding to the selected new VGA mode to the ROM 8. Then, the ROM 8 transmits corresponding parameters to the RAM 9. The M counter 13 and the N counter 15 obtain values of the parameters in the RAM 9, and generate a suitable reference frequency and a feedback frequency respectively. The PLL circuit 3 outputs a pixel clock frequency to the horizontal & vertical frequency signal generator 10 after the feedback frequency and reference frequency are generated. Subsequently, the horizontal & vertical frequency signal generator 10 generates a horizontal sync frequency and a vertical sync frequency. The horizontal & vertical frequency signal generator 10 includes a horizontal frequency signal generator 21 and a vertical frequency signal generator 22. The horizontal frequency signal generator 21 further includes a plurality of logic units (not shown) and a horizontal sync counter 210. The vertical frequency signal generator 12 also includes a plurality of logic units (not shown) and a vertical sync counter 220. The horizontal frequency signal generator 21 and the vertical frequency signal generator 22 read values of parameters which are viewed as initial values in the RAM 9, and the horizontal sync counter 210 and the vertical sync counter 220 count from the initial values respectively. These initial values are numbers from which the horizontal and vertical sync counters 210, 220 start counting. The display pattern generator 11 generates a plurality of color signals on RGB in digital format, which are directly sent to the D/A convertor 4. The controller 12 is used for encoding operating orders received from the keyboard 7, and for providing corresponding control signals to each part of the signal generator.

Figure 3:
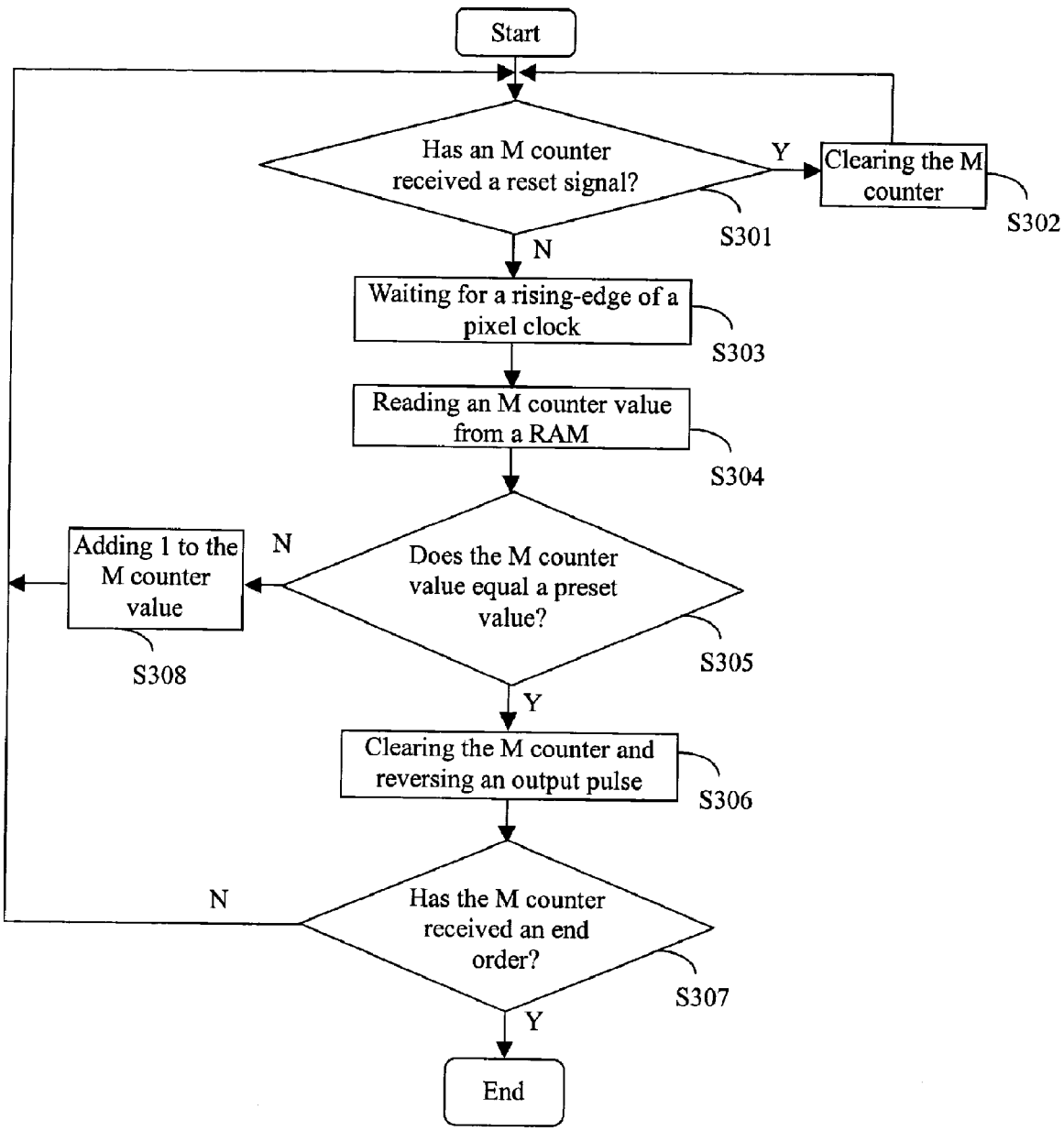
FIG. 3 is a flow chart illustrating work flow of an M counter of FIG. 2.

FIG. 3 is a flow chart illustrating work flow of the M counter 13 of FIG. 2. It should be noted that the N counter 15 works like the M counter 13 as described below. In step S301, the FPGA device 1 determines if the M counter 13 has received a reset signal. If the M counter 13 has received a reset signal, in step S302, the M counter 13 clears itself. That is, the M counter 13 counts again from an initial value of zero. Otherwise, if the M counter 13 has not received a reset signal, in step S303, the M counter 13 waits for a rising-edge of a pixel clock from the pixel clock generator 6. In step S304, the M counter 13 reads an M counter value from the RAM 9 when the M counter 13 receives a rising-edge of a pixel clock. In step S305, the FPGA device 1 determines if the M counter value equals a preset value. The preset value can be determined according to actual user requirements. If the M counter value equals the preset value, in step S306, the M counter 13 clears itself and reverses the output pulse of the M counter 13. In step S307, the FPGA device 1 determines whether the M counter 13 has received an end order. If the M counter 13 has received an end order, the procedure ends. Otherwise, if the M counter 13 has not received any end order, the procedure returns to step S301 described above.

In contrast, if in step S305 the M counter value doesn't equal the preset value, in step S308, the M counter 13 adds 1 to the M counter value, and the procedure returns to step S301 described above.

Figure 4:
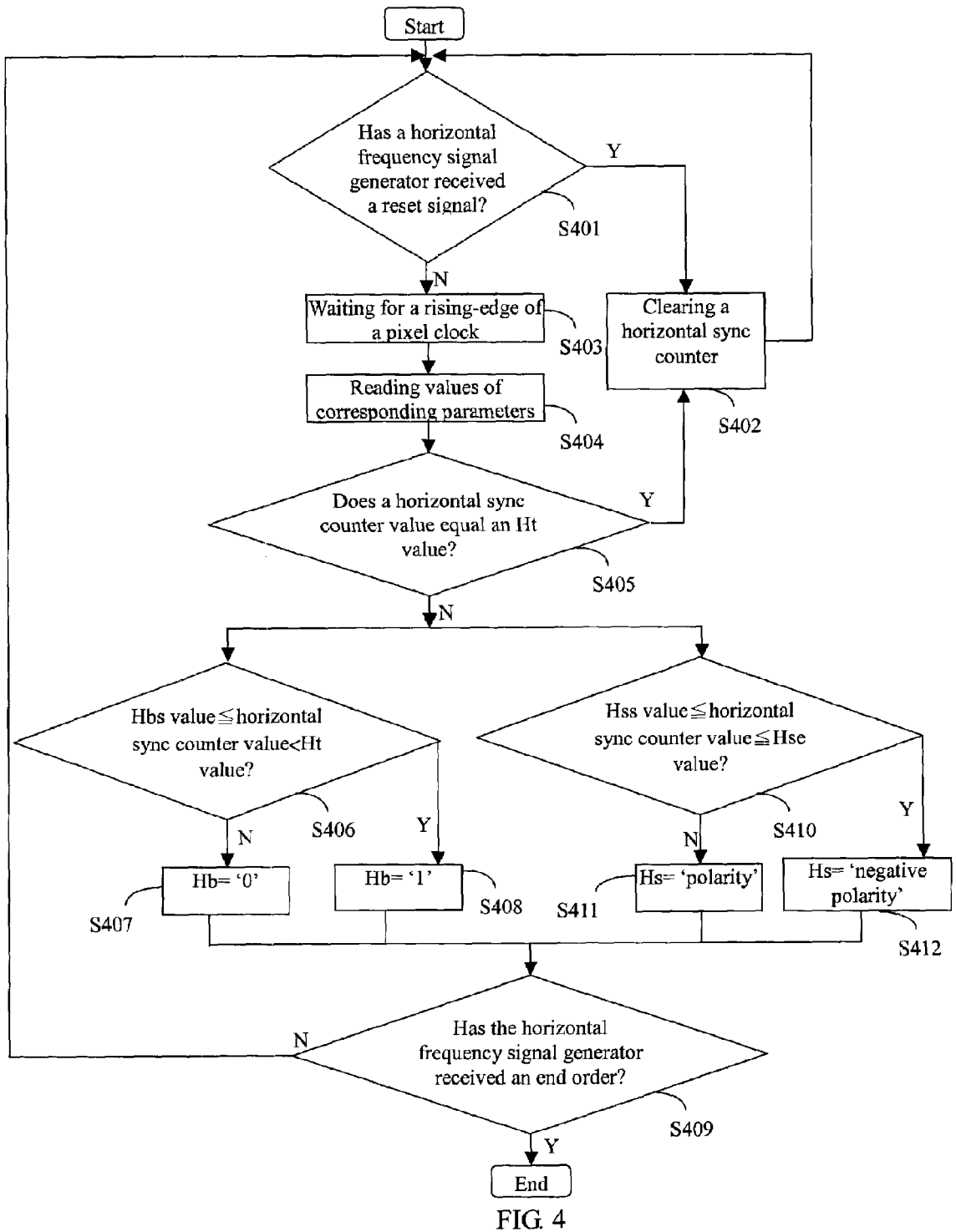
FIG. 4 is a flow chart illustrating work flow of a horizontal frequency signal generator of a horizontal & vertical frequency signal generator of FIG. 2.

FIG. 4 is a flow chart illustrating work flow of the horizontal frequency signal generator 21. It should be noted that the vertical frequency signal generator 22 works like the horizontal frequency signal generator 21 as described below. In step S401, the FPGA device 1 determines whether the horizontal frequency signal generator 21 has received a reset signal. If the horizontal frequency signal generator 21 has received a reset signal, in step S402, the horizontal sync counter 210 of the horizontal frequency signal generator 21 clears itself. That is, the horizontal sync counter 210 counts again from an initial value of zero. Otherwise, if the horizontal frequency signal generator 21 has not received a reset signal, in step S403, the horizontal frequency signal generator 21 waits for a rising-edge of a pixel clock from the PLL circuit 3. In step S404, the horizontal frequency signal generator 21 reads values of corresponding parameters from the RAM 9 after it receives a rising-edge of a pixel clock. The parameters include: Hbs, Hss, Hse, Ht and horizontal sync counter. In step S405, the FPGA device 1 determines whether the horizontal sync counter value equals the Ht value. If the horizontal sync counter value equals the Ht value, the procedure returns to step S402 described above. Otherwise, if the horizontal sync counter value does not equal the Ht value, in step S406, the FPGA device 1 determines whether the horizontal sync counter value satisfies a first inequation as follows: Hbs value≦horizon counter value<Ht value. If the horizontal sync counter value doesn't satisfy the first inequation, in step S407, the horizontal frequency signal generator 21 sets Hb=0. If the horizontal sync counter value satisfies the first inequation, in step S408, the horizontal frequency signal generator 21 sets Hb=1. In step S409, the FPGA device 1 determines whether the horizontal frequency signal generator 21 has received an end order from the keyboard 7. If the horizontal frequency signal generator 21 has received an end order from the keyboard 7, the procedure ends. Otherwise, if the horizontal frequency signal generator 21 hasn't received any end order from the keyboard 7, the procedure returns to step S401 described above.

On the other hand, if in step S405 the horizontal sync counter value doesn't equal the Ht value, in step S410, the FPGA device 1 determines whether the horizontal sync counter value satisfies a second inequation as follows: Hss value≦horizontal sync counter value≦Hse value. If the horizontal sync counter value doesn't satisfy the second inequation, in step S411, the horizontal frequency signal generator 21 sets Hs='polarity'. If the horizontal sync counter value satisfies the second inequation, in step S412, the horizontal frequency signal generator 21 sets Hs='negative polarity'.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:
1. A signal generator for generating video graphics array color signals, the signal generator comprising:
 a field program gate array device for generating horizontal sync frequencies and vertical sync frequencies according to a video graphics array mode selected by a user, and for generating digital signals on red-green-blue color according to a display pattern selected by the user;

a pixel clock generator for outputting pixel clocks at a frequency continuously to the field program gate array device;

a phase locked loop for generating required pixel clock frequencies, and outputting the pixel clock frequencies to the field program gate array device;

a programmable read only memory for storing configuration files for starting the field program gate array device;

a digital/analog convertor for converting the digital signals on red-green-blue color from the field program gate array device to analog signals; and a video graphics array interface for obtaining the horizontal sync frequencies and the vertical sync frequencies from the field program gate array device, and outputting video graphics array color signals.

2. The signal generator according to claim 1, wherein the digital/analog convertor is further used for transmitting the analog signals to the video graphic array interface.

3. The signal generator according to claim 1, wherein the video graphic array interface is a universal interface which can be directly connected to a liquid crystal display monitor.

4. The signal generator according to claim 1, wherein the field program gate array device comprises a horizontal & vertical frequency signal generator used for generating the horizontal sync frequencies according to the selected video graphics array mode.

5. The signal generator according to claim 4, wherein the horizontal & vertical frequency signal generator is further used for generating the vertical sync frequencies according to the selected display pattern.

6. The signal generator according to claim 1, wherein the field program gate array device comprises an M counter for outputting a feedback frequency to the phase locked loop.

7. The signal generator according to claim 4, wherein the field program gate array device further comprises an N counter for outputting a reference frequency to the phase locked loop.

8. The signal generator according to claim 1, wherein the field program gate array device comprises a display pattern generator which outputs digital signals on red-green-blue color to the digital/analog convertor.

9. The signal generator according to claim 1, wherein the field program gate array device comprises a controller which provides a plurality of control signals for all parts of the signal generator.

* * * * *